United States Patent

White

[15] 3,682,483

[45] Aug. 8, 1972

[54] MAGNETIC TAPE CARTRIDGE CHANGER AND MAGAZINE

[72] Inventor: Rowland K. White, Rockville, Md.

[73] Assignee: Qatron Corporation

[22] Filed: March 5, 1970

[21] Appl. No.: 16,703

[52] U.S. Cl. ....................274/4 F

[51] Int. Cl. ....................G11b 5/00

[58] Field of Search ..............274/4, 11; 179/100.2 Z; 353/116

[56] References Cited

UNITED STATES PATENTS

| | | | |
|---|---|---|---|
| 3,512,785 | 5/1970 | Ban | 274/4 F |
| 3,408,139 | 10/1968 | Schwartz | 274/4 F |
| 3,499,708 | 3/1970 | Hall | 353/107 |

*Primary Examiner*—Harry N. Haroian
*Attorney*—Paris, Haskell and Levine

[57] ABSTRACT

A record changer for magnetic tape recordings contained in tape cartridges, enables the random or programmed selection of tape cartridges. The changer moves a selected cartridge from a storage position in a magazine into play position, and after playing of the recording, the changer returns the cartridge to storage position in the magazine. The magazine is cylindrical in overall configuration, and has a plurality of cartridge receiving pockets arranged on radii of the magazine, which define open ended through passages axially along the magazine. Each pocket contains a resilient detent cooperating with a corresponding indent on an inserted cartridge for releasably retaining cartridges inserted in the pockets. The magazine is mounted on a rotatable spindle, for stepwise indexing of successive pockets over a playing head or magnetic transducer. A cartridge actuator is located adjacent the playing head to advance and retract a juxtaposed tape cartridge between a stored or retracted position in the magazine, and an extended or play position with its tape in engagement with the transducer and a tape driving capstan.

8 Claims, 11 Drawing Figures

INVENTOR
ROWLAND K. WHITE

BY Paris, Haskell & Levine
ATTORNEYS

INVENTOR
ROWLAND K. WHITE

BY Paris, Haskell & Levine
ATTORNEYS

INVENTOR
ROWLAND K. WHITE

BY Paris, Haskell & Levine
ATTORNEYS

INVENTOR
ROWLAND K. WHITE

BY Paris, Haskell & Levine
ATTORNEYS

MAGNETIC TAPE CARTRIDGE CHANGER AND MAGAZINE

BACKGROUND OF INVENTION

Sound recordings on magnetic tape have become a widespread form of home music entertainment. With simplified modes of operation afforded by cassette or cartridge packaging of the tapes, efforts have been directed to applying the concepts of automatic record changing to this form of recording. However, the mechanisms heretofore developed have been complex and expensive, and operationally relatively inflexible with respect to the random selection of recordings in any sequence desired by the operator.

SUMMARY OF THE INVENTION

The present invention relates to the combination of a magazine for storing a plurality of magnetic tape cartridges, and a cartridge changing mechanism. The changing mechanism is adapted to advance the magazine stepwise to index successive cartridges with a magnetic playing head, and to advance and retract indexed cartridges into playing relation with said head and back into stored position in said magazine. Because of the structure of the magazine and its cooperative relation with the cartridge changing and tape playing mechanism, the system may be readily programmed to play the recordings contained in the several cartridges automatically in a predetermined sequence, or the system can be manually controlled to play any desired cartridge in the magazine regardless of the existing index position of the magazine.

The present invention pertains primarily to the combination of magazine and cartridge changing apparatus, and not to the power drive mechanism therefor, the latter being the subject matter of the copending application of R. K. White and S. L. Lindbeck, Ser. No. 808,110, filed Mar. 18, 1969, and assigned to the same assignee as the present invention.

The magnetic tape cartridge magazine used in the practice of the present invention is generally cylindrical in overall form with a central axis. A plurality of cartridge receiving pockets are located about the central axis of the magazine, oriented on radii originating from said axis, and extending axially through said cylindrical magazine, providing open ended through passages from one end to the other of the magazine.

A resilient retaining member is contained in each cartridge pocket of the magazine, adapted to cooperate with the exterior configuration of a cartridge to retain a cartridge releasably in the pocket. Thus, a cartridge may be inserted in each pocket of the magazine and engaged by the resilient retaining member. In this condition the magazine functions to store a plurality of cartridges.

The cartridge changer operates to draw or advance an indexed cartridge from the magazine into a play position in engagement with a magnetic tape drive and playing head; and upon completion of the selection on the tape of said cartridge, the changer returns the cartridge to its pocket in the magazine, where it is held in retracted or stored position by said resilient retaining member. When all cartridges are in retracted position within the pockets of the magazine, the record changer effects a stepwise rotary indexing of the magazine on its axis to bring another selected pocket and cartridge into register with the magnetic record playing head, and then advance this cartridge out of the pocket into engagement with the record playing mechanism. Since magazine indexing is effected in a cyclical rotary mode, the magazine can be indexed to any cartridge position regardless of its starting position, thereby permitting complete random selectivity in the cartridge selection process.

It is accordingly one object of the present invention to provide a magazine for magnetic tape cartridges in combination with a cartridge changer for facilitating the playing of a sequence of cartridges contained in said magazine.

Another object of the present invention is to provide a record changer for cartridge housed magnetic tape recordings.

Another object of the present invention is to provide for the storing of a plurality of magnetic tape cartridges in a magazine, for the stepwise and cyclically repetitive indexing of successive cartridges into registry with a magnetic tape drive and playing head, and for the advancement of a registered cartridge out of said magazine into engagement with said tape drive and playing head and the retraction thereof into stored position within said magazine.

Other objects and advantages of the present invention will become apparent to those skilled in the art from a description of the following exemplary specific embodiment of the invention, had in conjunction with the accompanying drawings, wherein like numerals refer to like or corresponding parts.

DETAILED DESCRIPTION OF ONE EMBODIMENT

Figure 1:
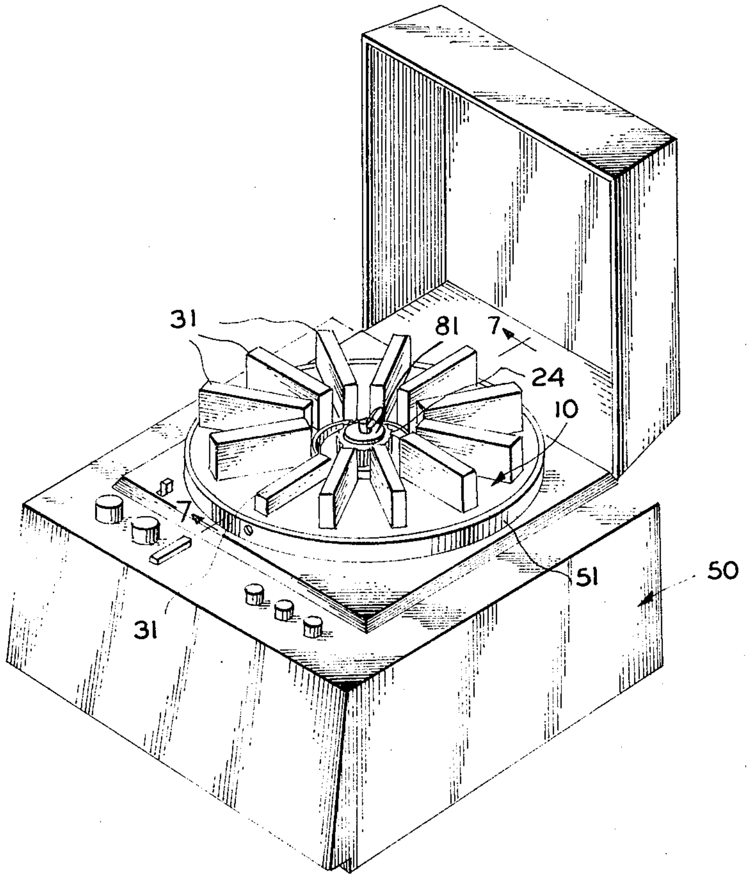
FIG. 1 is a perspective view of a magnetic tape cartridge magazine positioned in a player housing for operating cooperation with a cartridge changing and a tape playing unit contained in the housing.
Figure 6:
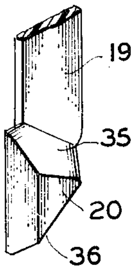
FIG. 6 is an enlarged fragmentary view of a resilient retainer member used to hold the cartridges releasably in the magazine pockets.
Figure 2:
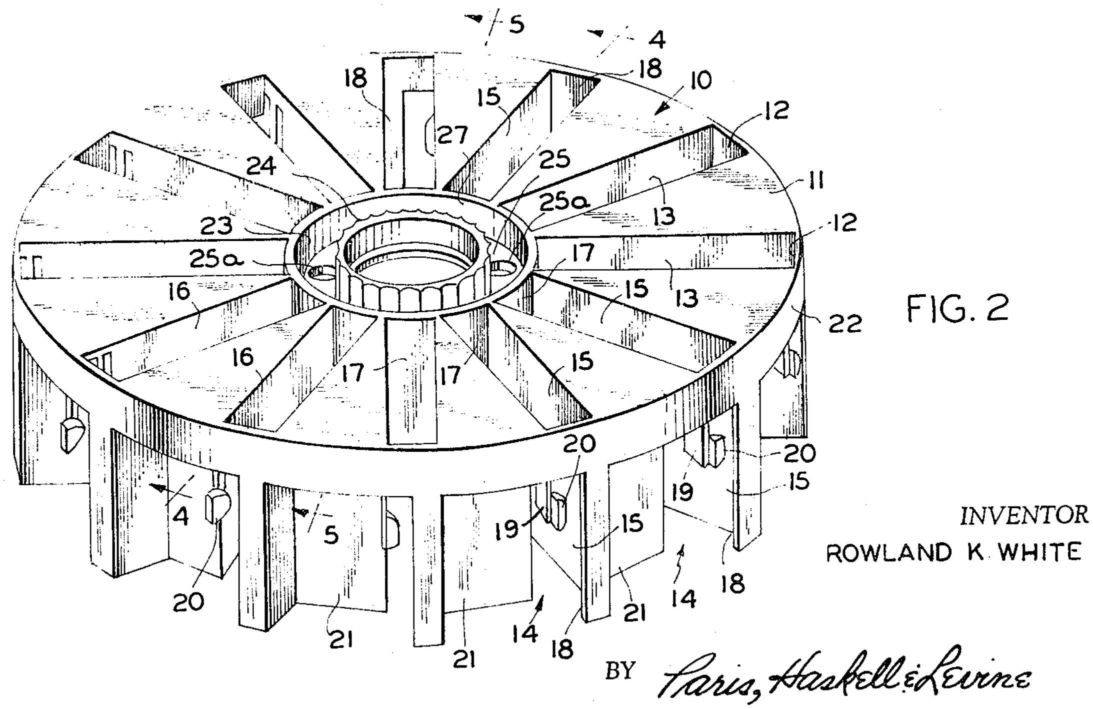
FIG. 2 is a perspective view of a magnetic tape cartridge magazine utilized in practicing the present invention.
Figure 3:
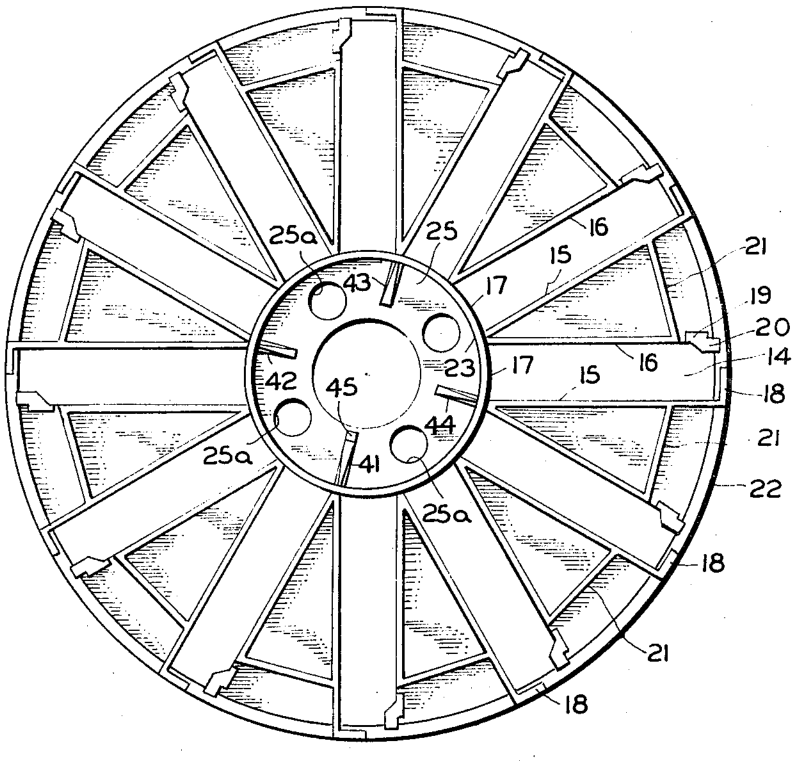
FIG. 3 is a bottom plan view of the magazine shown in FIG. 2.

As stated above, the present invention utilizes a magazine for storing and feeding a desired number of magnetic tape cartridges. A suitable magazine is generally denoted by the numeral 10, and is shown in detail in FIGS. 2 through 6. This magazine is formed with an overall cylindrical configuration. The major portion of the upper surface is defined by a deck 11, through which are a plurality of open slots 12, 12 such slots being shown in the drawings. The slots 12 are arranged on radii of the cylindrical axis of the magazine, and define the entrances to pockets 13 that extend axially through the cylindrical magazine. The bottoms of the pockets 13 are also open and unobstructed, as indicated at 14.

Each pocket 13 is further defined by a pair of side walls 15 and 16, an inner wall 17, and a partial outer wall 18. At its outer portion, each side wall 16 terminates short of the outer limit of the pocket 13, and in place of the wall a tab 19 depends from the deck 11 coplanar with its wall 16. The tab 19 is free from connection to other structure except at its top junction with the deck 11. If the magazine is fabricated from plastic, such as a phenol aldehyde, as is preferred, or if the magazine is fabricated from sheet metal, the tabs 19 have an inherent spring resilience in the directions perpendicular to their respective side walls 16. If the magazine 10 is fabricated from a material that does not possess this characteristic, the tabs 19 would be formed separately from a springy material and attached in place rather than being formed integrally with the rest of the magazine, as shown. Each tab 19 is provided at its free end with protuberance 20 extending a short distance into the pocket 13, and it is preferably substantially frusto-tetrahedral in shape for reasons that will become apparent subsequently.

To lend rigidity, strength and a finished appearance to the magazine, a connecting wall or web 21 is provided between each side wall 15 of one pocket 13 and the side wall 16 of the pocket 13 adjacent thereto. These connecting webs are set back from the periphery of the magazine, inwardly of the tabs 19, so as not to interfere with the spring movement of the tabs transversely of the planes of the tabs. Also, to provide strength, rigidity, and a finished appearance, a peripheral skirt 22 depends from the upper deck 11 to a point slightly above the protuberances 20 on tabs 19; and similarly, the inner walls 17 are actually part of a continuous inner ring 23.

Interiorly of ring 23 a circular boss 24 is provided, carried by an annular web or shelf 25 extending inwardly from ring 23. These latter elements are located in the upper central or hub region of the magazine. The boss 24 is a handle or grip whereby a user may grasp the magazine by inserting the fingers in the annular space 27 between the boss 24 and the ring 23. Finger holes 25a may be provided in web or shelf 25 to facilitate grasping of the magazine.

Figure 4:
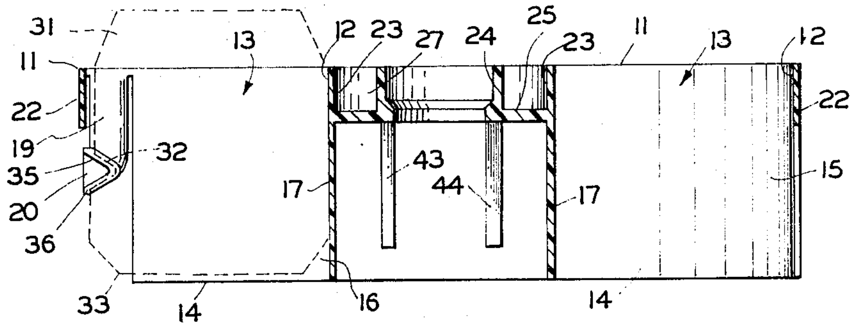
FIG. 4 is a vertical cross sectional view of the magazine taken along the line 4—4 of FIG. 2, with a magnetic tape cartridge shown in phantom in stored position.
Figure 5:
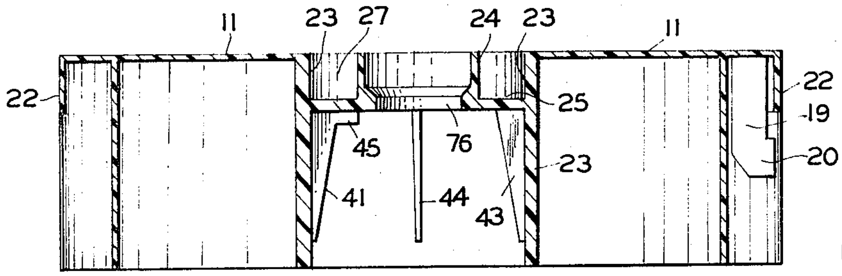
FIG. 5 is a vertical cross sectional view of the magazine taken along the line 5—5 of FIG. 2.

The magazine 10 is intended to receive a magnetic tape cartridge 31 in each of the pockets 13, one cartridge being indicated in phantom lines in the sectional view of FIG. 4. As is conventional, the cartridge has a triangular indent 32 on one side face adjacent its edge. The shape and size of the protuberance 20 on tab 19 is selected to fit part way into the indent 32, and thereby function as a spring urged detent. The outside width and depth dimensions of the cartridge 31 are substantially equal to, but slightly less than those of the pocket 13. Thus, when a cartridge 31 is manually inserted in a magazine pocket 13 through its top slot 12, it is guided therein by sliding cooperation between its two side walls and the side walls 15 and 16 of the pocket, and by sliding cooperation between the cartridge front and rear edge walls and the corresponding outer and inner pocket walls 18 and 17.

As previously stated, the detent elements 20 protrude somewhat into the pockets 13. Thus, when a cartridge is inserted into a pocket 13 through a slot 12, its bottom portion is guided along the pocket walls, and when its bottom end 33 abuts the detent 20, the detent is cammed outwardly of the pocket against the resilient bias of the tab 19, permitting the cartridge to continue its downward movement into the pocket. When the cartridge 31 has been inserted to the point where the indent 32 is juxtaposed with the detent 20, the spring resilience of the tab 19 causes the detent 20 to enter the indent 32, and thereby retain the cartridge in the position in FIG. 4. Cartridges in this position in the magazine are in a stored position, and the retaining effect of the detent holds the cartridges in position when the magazine is moved about. As is conventional, there are openings in the bottom wall 33 of cartridge 31, permitting access to the magnetic tape in the cartridge by a playing head and a tape drive. Accordingly, it is preferred that the position of detent 20 relative to indent 32 be selected to locate the bottom edge of the cartridge slightly above the bottom of the magazine, when the cartridge is in stored position, to protect the exposed portion of the tape from damage when the magazine is placed on a surface or moved thereover.

The edges 35 and 36 of detent 20, which engage the indent 32 in the cartridge 31 are beveled. This configuration facilitates the camming of the detent when the cartridge is first inserted in the magazine, as above described. Also, this configuration permits the inserted and stored cartridge to be readily withdrawn upwardly from the magazine for removal, or to be advanced downwardly into a playing position for engagement of the tape by a playing head and a tape drive mechanism.

In the central hub of the magazine, under the boss 24 and annular web 25, four tapered splines 41, 42, 43 and 44 are formed on the inside of the lower portion of ring 23. These splines are designed to guide the magazine onto the head of a rotary spindle, and spline 41 is keyed at 45 so as to provide an angular index for the positioning of the magazine upon the spindle.

As shown in FIG. 1, magazine 10, fully or partially loaded with tape cartridges 31, is intended to be mounted on a spindle within the opening defined by frame 51 on housing 50. Housing 50 contains a magnetic transducing head and tape drive therefore, an indexing spindle structure for bringing successive cartridges in alignment with the tape transducer and drive, and a mechanism for advancing and retracting indexed cartridges between play position and stored position in the magazine.

Figure 7:
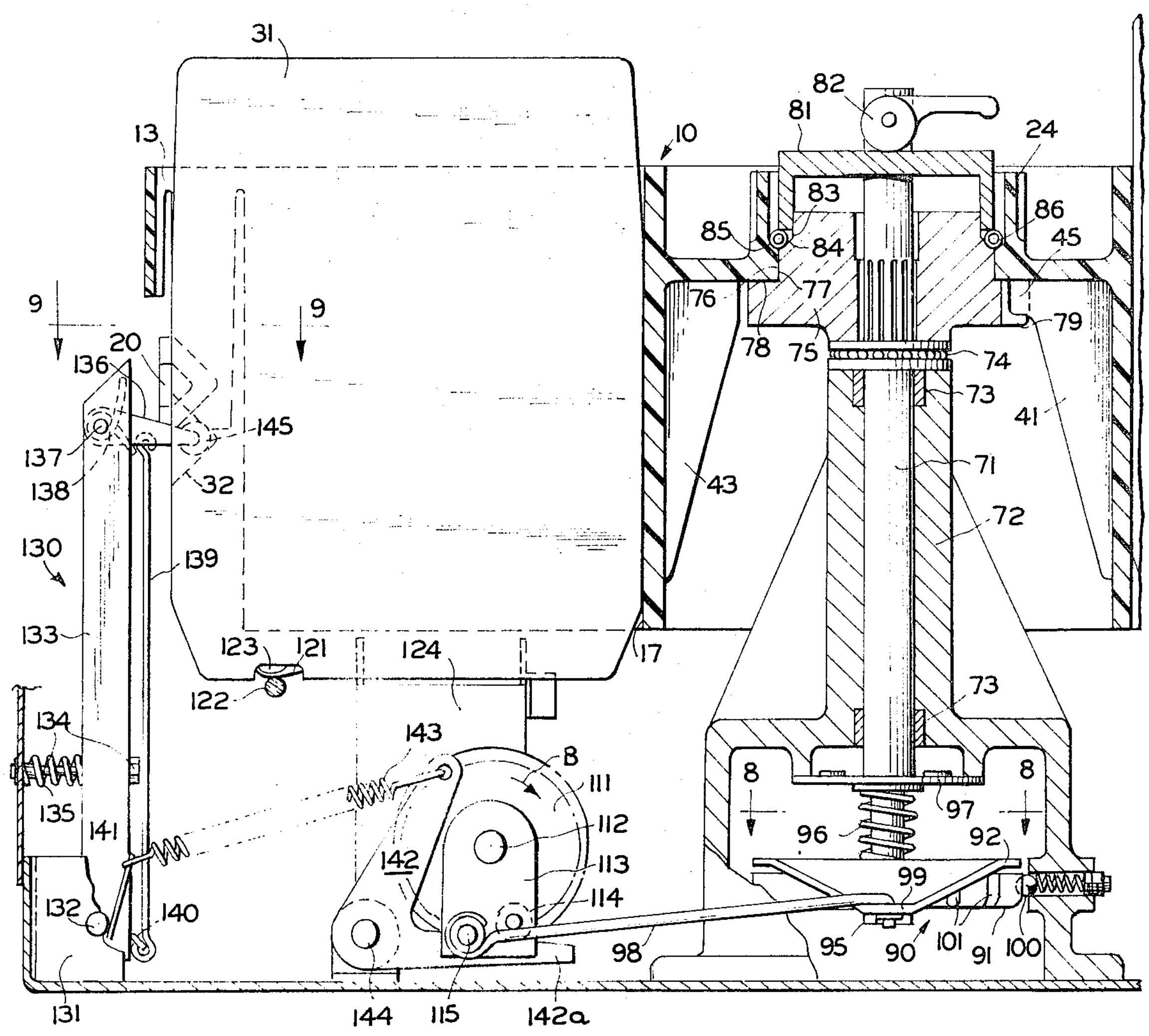
FIG. 7 is a partial vertical sectional view taken along line 7—7 of FIG. 1, showing the magazine indexing and cartridge advancing and retracting mechanism in the record playing condition.
Figure 8:
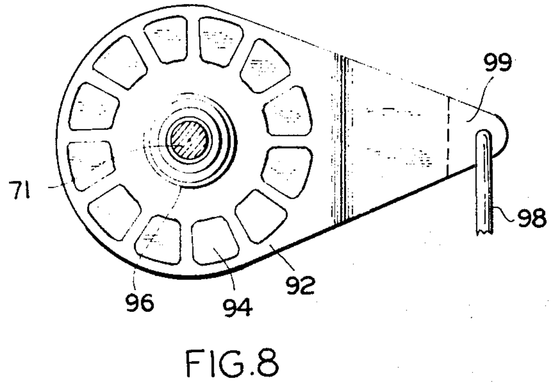
FIG. 8 is a fragmentary cross sectional view taken along line 8—8 of FIG. 7, and showing a detail of the magazine indexing mechanism.

The spindle structure mounting the magazine 10 in the player housing 50 for rotational indexing movement, is shown in FIG. 7, and comprises the central shaft 71, supported in the chassis mounted standard 72 by rotary bearings 73 and thrust bearing 74. A spindle head 75 is permanently affixed to the upper end of shaft 71 for rotation therewith, and is configured to receive the central opening 76 in the hub of the magazine 10. The central opening 76 telescopically fits over the vertical circular wall portion 77 of head 75, and rests upon the annular flange 78 on the head. The key 45 on spline 41 enters notch 79 in the spindle head, and thereby fixes the angular relation of the magazine 10 to the spindle. As thus assembled, spindle shaft 71, spindle head 75, and magazine 10 will rotate as a unit.

Magazine 10 is shown locked to spindle head 75 in FIG. 7, but it is readily removable for exchange with another magazine, as will be explained. Cap 81 is axially slidably mounted over the top of spindle 71, under control of the toggle clamp 82, and telescopically slides over the vertical circular wall portion 83 of the spindle head. The bevel annulus 84 on the spindle head, and the mirror image bevel annulus 85 on the central hub of the magazine, meet, and together form an annular "V" groove in which a circularly configured helical spring 86 is located. When the toggle clamp 82 is positioned as shown in FIG. 7, it cams cap 81 downwardly against the spring 86, causing it to expand and enter the base of the "V" annulus, and thereby lock the magazine in position on the spindle head 75, as shown in FIG. 7. If the toggle clamp 82 is turned a quarter turn, or more, counterclockwise as viewed in FIG. 7, the contraction force of annular spring 86 causes it to ride up the bevel annulus 84, forcing cap 81 upward. In so doing, spring 86 no longer clamps the hub of magazine 10, and the magazine can then be lifted upwardly off the spindle, and replaced with a different magazine, if desired.

Figure 10:
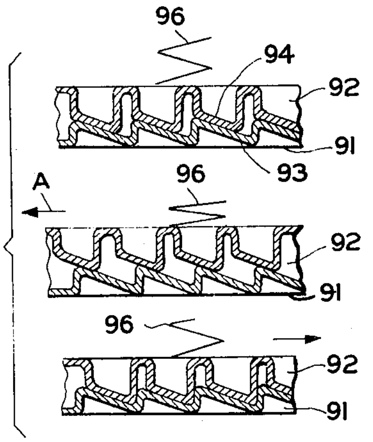
FIG. 10 is a detailed sectional view taken along line 10—10 of FIG. 8, showing various operational stages of the magazine indexing mechanism.

Stepwise rotation of spindle 71 and magazine 10 mounted thereon, is effected by a ratchet drive 90, comprising a ratchet wheel 91 and a pawl 92. The ratchet wheel 91 may be a stamped metal disc having an annular set of sawtooth depressions 93 pressed in its surface, and the pawl 92 may be a correspondingly shaped metal disc stamped with an annular set of inverted and complementary sawtooth formations 94. Thus, oscillation of pawl 92 over a uniform arc causes stepwise rotation of ratchet wheel 91 in uniform increments in the manner illustrated in FIG. 10.

Ratchet wheel 91 is affixed at 95 to the bottom end of shaft 71 for unison rotational movement, while pawl 92 is rotationally mounted on shaft 71, and is biased by helical spring 96 into engagement with the ratchet wheel 91. Spring 96 bears between the upper surface of pawl 92 and a washer on disc 97. Oscillatory movement of the pawl 92 is obtained by reciprocatory action of the link 98 connected to the arm 99 extending outwardly from the pawl 92. In order to restrain ratchet wheel 91 during retrace movement of pawl 92, (i.e. during movement of the pawl in the direction of arrow A in FIG. 10), spring pressed ball detent 100 is provided on frame standard 72, coacting with indents 101 positioned circumferentially about the ratchet wheel in correspondence with the ratchet steps 93.

By means of a drive train and control actuator, not shown, gear or pulley 111 is caused to make a 360° revolution in the direction of arrow B as required for operation of a record cartridge change cycle. Gear or pulley 111 drives shaft 112, which in turn drives eccentric or crank 113. The end of link 98 remote from pawl arm 99 is connected to the eccentric 113 through stub shaft 115. Thus, for each rotational cycle of gear or pulley 111 and eccentric 113, link 98 goes through one reciprocatory cycle, and drives the ratchet 90 through one oscillatory cycle, causing the spindle 71 and magazine 10 to undergo one rotary step.

Figure 9:
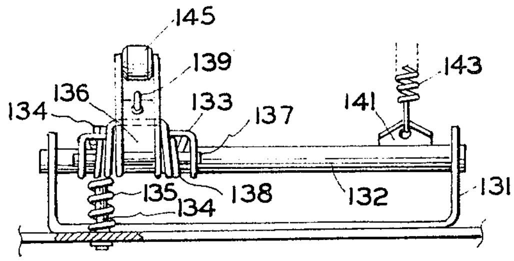
FIG. 9 is a fragmentary cross sectional view taken along line 9—9 of FIG. 7, and showing a portion of the cartridge advancing and retracting mechanism.
Figure 11:
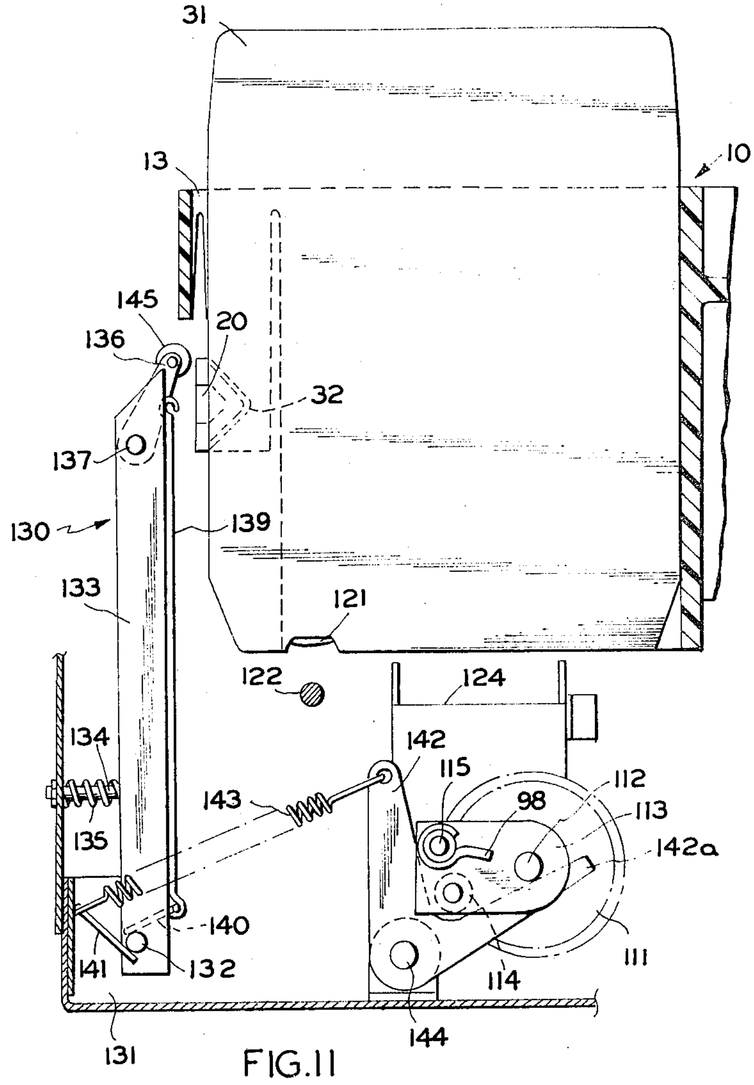
FIG. 11 is a vertical sectional view corresponding to a portion of FIG. 7, showing the mechanism in the cartridge retracted condition, and about to effect a magazine indexing step.

Cartridge 31 is shown in FIGS. 4 and 11 in retracted or stored position in the magazine 10, retained by the detent 20 engaging the cartridge indent 32. In FIG. 7, the cartridge is shown in advanced or play position, with tape 121 engaged between a driving capstan 112 (rotationally driven by a motor and flywheel not shown) and a cartridge pinch roll 123, causing the tape to pass over a magnetic transducing head generally indicated at 124. Movement of the cartridge 31 between stored and play positions is effected by the cartridge advancing and retracting mechanism, generally designated 130 and shown in FIGS. 7, 9 and 11. The mechanism 130 is located on the chassis, so that when the magazine 10 is indexed by the spindle with a pocket 13 located over the magnetic transducing head 124 and the capstan 122, the mechanism 130 can engage the cartridge in that pocket, advance it to play position, and when play is completed, retract it to stored position.

The cartridge advance and retract mechanism 130 is mounted on a chassis carried U-bracket 131 which pivotally mounts rockshaft 132. The bottom end of an upright channel shaped standard 133 is mounted on the shaft 132, with relative rotational movement therebetween; and the upright standard is yieldably restrained in fixed position by the bolt 134 and spring 135 urging the standard 133 against the head of the bolt. At the upper end of the standard 133, a cartridge actuator lever 136 is pivotally mounted on the cross shaft 137. A torsion spring 138 is tensioned between the lever 136 and standard 133 to urge the lever 136 upwardly, or counterclockwise as seen in FIG. 7, into the position shown in FIG. 11. A rod 139 is affixed at one end to the lever 136, and depends therefrom to engage rocker arm 140 mounted on the rockshaft 132. A second rocker arm 141 on rockshaft 132 is connected to one arm of bell crank 142 by helical spring 143. Bell crank 142 is in turn pivotally supported on the chassis at 144, and is held in the position shown in FIG. 7 by the action of camming roller 114 carried by eccentric 113.

Thus, when gear or pulley 111 goes through a cycle of revolution, movement of roller 114 away from crank arm 142a releases the bell crank 142 to pivot counterclockwise, thereby enabling the spring 138 to raise the cartridge actuator lever 136, pulling rod 139 therewith, causing rockshaft 132 to rock counterclockwise through rocker arm 140, and through rocker arm 141 and spring 143 causing the bell crank to pivot counterclockwise into the position shown in FIG. 11. As drive 111 nears completion of a 360° rotary cycle, cam roller 114 on the eccentric 113 again engages arm 142*a* of the bell crank causing it to pivot clockwise back to the position shown in FIG. 7. The latter action, of course, has a reverse effect on the linkage comprised of spring 143, rockshaft 132, and rod 139, causing the cartridge actuating lever 136 to be drawn down again into position shown in FIG. 7.

The free end of cartridge actuator arm 136 has a cartridge engaging roller 145. The actuator arm 136 is located to enter that pocket of magazine 13 indexed in front of it, through the open or slot area in the outer cylindrical wall of the magazine, and it enters adjacent the detent 20. Therefore, when the bell crank 142 pulls the actuator lever down, the roller 145 enters the cartridge indent 32, overcomes the retaining force of detent 20, and drives the cartridge from the stored position of FIG. 11 to the play position of FIG. 7. When the camming roller 114 on eccentric 113 releases the bell crank 142, the force of spring 138 drives the actuator lever up, carrying the cartridge 31 from the position shown in FIG. 7 to that shown in FIG. 11. In so doing, the cartridge is returned to retention control of the detent 20, as the actuator lever roller 145 then leaves the cartridge indent 32.

In order to hold the cartridge stable during tape playing operations, the relationship of parts is chosen so that an indexed cartridge is forces against the inner wall 17 of pocket 13 by the actuator 136 as a point of reference and alignment with the tape drive and magnetic transducer. Resilient pressure in this direction is obtained by having standard 113 forced slightly against the spring 135. Spring 135 also affords an additional safety feature, in allowing the standard 133 and actuator lever 136 to yield against the spring should an operator force a cartridge 31 in or out of play position while the bell crank 142 is locked in the play position shown in FIG. 7. Spring 143 also can yield under these conditions to further aid in protecting the equipment and cartridge. In addition, compliance of spring 143 can compensate for greater tolerances in the cartridge advance and retract linkage than would be permissible if this spring were replaced by a rigid link. It will be apparent, however, that spring 143 must be stiffer than spring 138 in order for the linkage to function in the manner described.

Considering one complete cartridge change cycle, and starting with a first cartridge in play position as shown in FIG. 7, the change cycle may be initiated, for example, by an electrically conductive strip at the end of the tape recording acting on a pair of switch contacts. In the first quarter cycle of movement of gear 111 and eccentric 113 in the direction of arrow B, the ratchet pawl 92 moves one step over the ratchet wheel 91 in the direction of arrow A in FIG. 10, while detent 100 holds the ratchet wheel in fixed position. At the same time, bell crank 142 is released, enabling spring 138 to drive lever 136 upwardly and cause the cartridge 31 to be retracted from the play position of FIG. 7 into the stored position of FIG. 11. In the next half cycle of gear 111 and eccentric 113, link 98 reverses direction and causes pawl 92 to drive the ratchet wheel 91 one step, which amounts to the angular displacement between two adjacent pockets 13 in the magazine 10, thus bringing the next adjacent cartridge in the magazine into index position relative to the magnetic play head and tape drive capstan. In the final quarter cycle of the gear 111 and eccentric 113, roller 114 cams arm 142*a* of the bell crank into the position shown in FIG. 7, causing actuator lever 136 to advance the newly indexed cartridge into play position.

From the foregoing description of one embodiment of the invention, it will be appreciated that there is provided a magnetic tape cartridge changer for tape cartridge players. The changer includes a cylindrical magazine for holding and storing a plurality of magnetic tape cartridges, in combination with a stepwise drive for the magazine to index successive cartridges in the magazine into alignment with a play position, and a cartridge actuator for advancing an indexed cartridge into play position and for retracing the cartridge into stored position in the magazine. The magazine is provided with a plurality of cartridge pockets oriented along radii of the cylindrical magazine. The pockets correspond closely in transverse dimensions to the transverse dimensions of the cartridges intended to be stored therein, and the pockets define through passages in the axial dimension of the magazine without top or bottom closures. A resiliently urged detent projects into each pocket to engage an inserted cartridge releasably in an indent in the cartridge wall. When inserted into a pocket and engaged by a detent, the cartridge is stored in said magazine. However, the cartridge may be manually retracted out of the magazine pocket through one open end of the pocket, or advanced through the pocket by the cartridge actuator to extend out the other open end of the magazine into engagement with a tape drive and magnetic transducer. The correspondence in transverse dimensions between the cartridge and pocket assures that the cartridge indent will attain juxtaposition with the magazine retaining detent, and that alignment of the cartridge with the axis of the magazine will be maintained on traverse of the cartridge through the magazine pocket to facilitate accurate location of the cartridge relative to the tape transducing and drive mechanism.

It is apparent that the invention is not limited to the particular details of the preceding description of one exemplary embodiment, and that numerous modifications and variations will be conceived by those skilled in the art. For example, a rigid link could be substituted for spring 143 if desired, and spring 138 could be eliminated as a linkage drive means, relying on the cam operation of roller 114 on the bell crank 142 to move the lever 136 upwardly. Accordingly, all modifications and variations as are embraced by the spirit and scope of the appended claims are contemplated as being within the purview of the present invention.

What is claimed is:

1. A magnetic tape cartridge changer, comprising a rotary spindle, a magazine of overall cylindrical configuration mounted on said spindle for rotation therewith and having a plurality of channels arranged about said spindle for holding a plurality of tape cartridges, tape drive and magnetic transducing means positioned at a tape playing station, means for rotationally stepping said spindle to index successive cartridge holding channels into juxtaposition with said drive and transducing means, means for effecting reciprocatory movement of a cartridge held in an indexed magazine channel toward and away from said drive and transducing means, and a fixed position resilient detent means in each channel for releasably holding a cartridge therein in a reference orientation, said detent means cooperating with an indent on a cartridge positioned in a channel, said reciprocatory movement effecting means comprising a movable arm positioned to enter an indexed channel and engage said indent of a cartridge retained therein and drive said cartridge from said reference orientation into engagement with said tape drive and transducing means and return said cartridge to said reference orientation engaged by said detent.

2. A magnetic cartridge changer as set forth in claim 1, wherein said rotational stepping means includes a pawl and ratchet means, a first reciprocating means for operating said pawl and ratchet stepping means, a second reciprocating means for operating said cartridge reciprocatory means, and a single cyclically operating driver for said first and second reciprocating means for effecting synchronized operation thereof.

3. A magnetic tape cartridge changer, comprising a rotary spindle, a magazine of overall cylindrical configuration mounted on said spindle for rotation therewith and having a plurality of channels arranged about said spindle for holding a plurality of tape cartridges, tape drive and magnetic transducing means positioned at a tape playing station, means for rotationally stepping said spindle to index successive cartridge holding channels into juxtaposition with said drive and transducing means, means for effecting relative reciprocatory movement toward and away from each other between said drive and transducing means and a cartridge held in an indexed magazine channel, a fixed position resilient detent means in each channel for releasably holding a cartridge therein in a reference orientation, said channels being axial through passages in said magazine, said tape drive and transducing means being fixedly positioned under said magazine in alignment with an indexed channel, said reciprocatory movement effecting means comprising an arm mounted peripherally exterior of said magazine adjacent an indexed channel, each channel having a slot to permit entry of said arm into said channel, means for moving said arm into an indexed channel to grip a cartridge positioned therein in reference orientation and drive the same downwardly into engagement with said tape drive and transducing means and return the same upwardly to said reference orientation, said detent means cooperating with a reference indent on a cartridge positioned in a channel, and said arm including means for entering said indent to grip said cartridge.

4. A magnetic tape cartridge changer as set forth in claim 3, and including means for resiliently urging said arm inwardly of said channel, whereby a cartridge in said channel is resiliently urged against an inner wall of said channel by said arm to reference the position of said cartridge relative to said tape drive and transducing means and to retain said cartridge under positive control of said arm.

5. A magnetic tape cartridge changer as set forth in claim 3, wherein said channels are arranged substantially along radii of said magazine.

6. In combination, a housing having a guide channel, a magnetic tape cartridge positioned in said channel, tape drive and magnetic transducing means positioned adjacent one end of said channel, and means for effecting reciprocatory movement of said cartridge along said channel toward and away from said drive and transducing means between a play position and a retracted position, said cartridge having an indent along one side thereof, said means for effecting reciprocatory movement including means entering said indent and thereby engaging said cartridge, drive means imparting a reciprocatory motion to the last-mentioned means with a component along said channel to drive said cartridge into said play position in engagement with said tape drive and magnetic transducing means and to drive the cartridge away therefrom into said retracted position.

7. In the combination as set forth in claim 6, control means for said reciprocatory drive means for initiating and programming its reciprocatory motion.

8. In the combination of claim 6, a fixed position resilient detent means in said channel cooperating with said cartridge indent for releasably holding said cartridge in a reference position for entry of said cartridge engaging means into said cartridge indent.

* * * * *